UNITED STATES PATENT OFFICE.

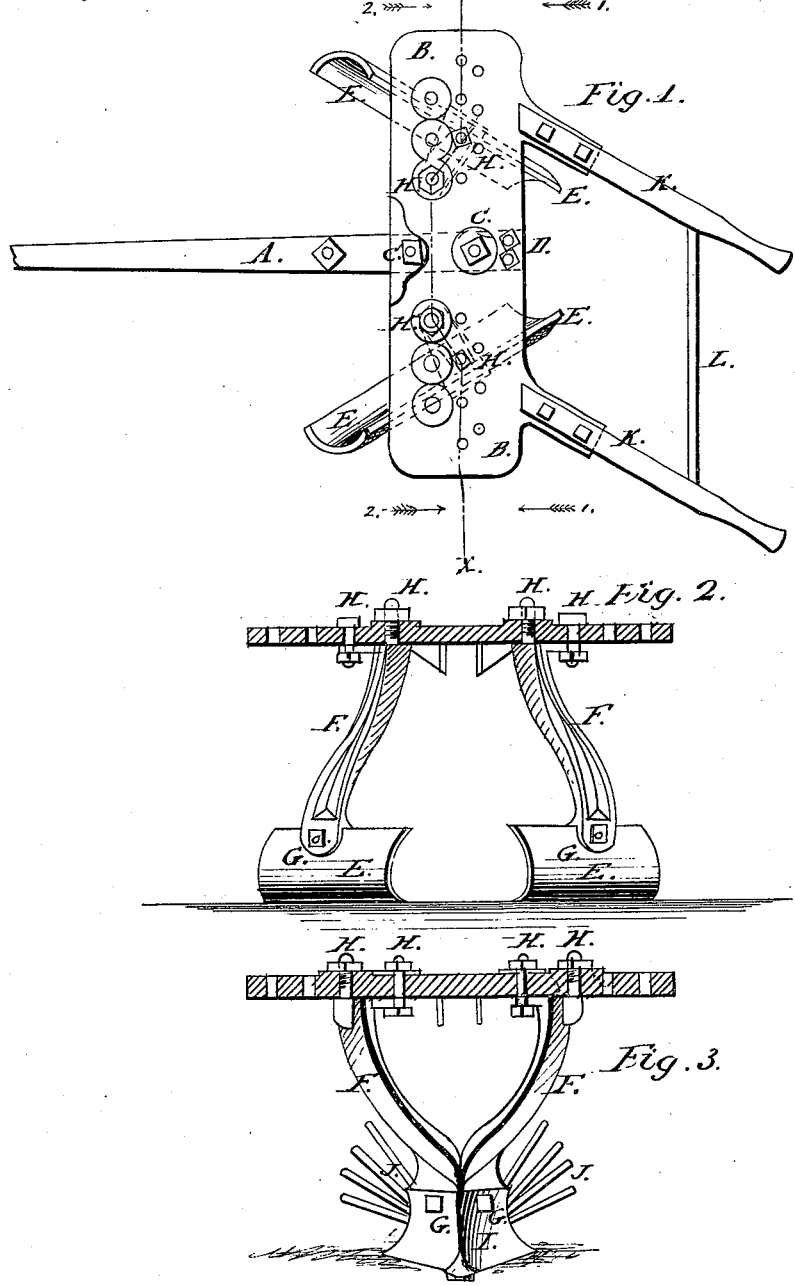

SAMUEL HUBER, OF DANVILLE, PENNSYLVANIA.

IMPROVEMENT IN COMBINED PLOW AND CULTIVATOR.

Specification forming part of Letters Patent No. 93,203, dated August 3, 1869.

*To all whom it may concern:*

Be it known that I, SAMUEL HUBER, of Danville, in the county of Montour and State of Pennsylvania, have invented a new and Improved Combined Plow and Cultivator; and I do hereby declare that the following is a full, clear, and exact description thereof, which will enable others skilled in the art to make and use the same, reference being had to the accompanying drawings, forming part of this specification, in which—

Figure 1 is a top view of my improved machine arranged as a cultivator or coverer. Fig. 2 is a detail sectional view of the same, taken through the line $x$ $x$, Fig. 1, looking in the direction of the arrows 1. Fig. 3 is a detail sectional view of the same arranged as a potato-digger, taken through the line $x$ $x$, Fig. 1, looking in the direction of the arrows 2.

Similar letters of reference indicate corresponding parts.

My invention has for its object to furnish an improved plow, which shall be so constructed and arranged that it may be easily adjusted for use as a furrowing-plow, coverer, cultivator, or potato-digger, and which shall at the same time be simple in construction, easily adjusted, and effective in operation in whatever way it may be used; and it consists in the construction and combination of the various parts of the machine, as hereinafter more fully described.

A is the tongue, to which the draft is applied, and the rear end of which is secured to the plate B by bolts C.

D are set-screws passing down through the plate B and connected with the rear end of the tongue A, so that by loosening or tightening the nuts upon the bolts C and turning the set-screws D in or out the pitch of the plow may be adjusted, as desired.

E are the furrowing or cultivating plows, which are made in about the manner shown in Figs. 1 and 2—that is to say, somewhat similar to sections of a hollow cylinder with inclined ends. The plows E are secured to the lower ends of the standards F by bolts G. The upper ends of the standards F are secured to the plate B by bolts H, as shown in Figs. 1, 2, and 3. Several sets of holes are formed through the plate B for the reception of the bolts H, so that by shifting the position of said bolts H the plows may be adjusted nearer together or farther apart, or set at a different inclination, according to the particular use to which the machine is to be applied.

When the machine is to be used for digging potatoes, the standards F are shifted so as to bring their lower ends together, which said lower ends are then placed between and are bolted to the mold-boards of the double mold-board plow I by means of the same bolts G by which the plows E were bolted to said standards F, as shown in Fig. 3.

To the rear parts of the mold-boards of the plow I are bolted or otherwise secured fingers J, bent into a suitable shape, so as to allow the soil raised by the plow I to pass through them, while the potatoes drop down upon the top of the ground.

K are the handles, the lower ends of which are bolted to the plate B and the upper end of which may be connected by a cross-bar or round, L, in the ordinary manner, as shown in Fig. 1. The handles K may be set at an inclination, if desired, for the convenience of the operator.

Having thus described my invention, what I claim as new, and desire to secure by Letters Patent, is—

1. The plate B, provided with several sets of holes for the adjustable attachment of the plow-standards, substantially as herein shown and described, and for the purpose set forth.

2. The combination of the adjustable plow-standards F with the plate B, substantially as herein shown and described, and for the purpose set forth.

3. The plows E, constructed as described, in combination with the adjustable standards F and plate B, substantially as and for the purpose set forth.

4. The combination of the double mold-board plow I with the adjustable standards F and plate B, substantially as herein shown and described, and for the purpose set forth.

5. The combination of the fingers J with the mold-boards of the double mold-board plow I, adjustable standards F, and plate B, substantially as herein shown and described, and for the purpose set forth.

SAMUEL HUBER.

Witnesses:
R. H. WOOLLEY,
B. P. ALWARD.